(12) United States Patent
Mackinnon

(10) Patent No.: US 7,112,009 B2
(45) Date of Patent: Sep. 26, 2006

(54) APPARATUS AND METHOD FOR HORIZONTAL SUBSEA CONNECTION

(75) Inventor: Calum Mackinnon, Aberdeen (GB)

(73) Assignees: Technip France SA, (FR); Technip Offshore UK Limited, (GB)

( * ) Notice: Subject to any disclaimer, the term of this patent is extended or adjusted under 35 U.S.C. 154(b) by 0 days.

(21) Appl. No.: 10/497,065

(22) PCT Filed: Nov. 29, 2002

(86) PCT No.: PCT/IB02/05742

§ 371 (c)(1),
(2), (4) Date: Aug. 23, 2004

(87) PCT Pub. No.: WO03/048518

PCT Pub. Date: Jun. 12, 2003

(65) Prior Publication Data

US 2004/0265066 A1    Dec. 30, 2004

(30) Foreign Application Priority Data

Dec. 1, 2001   (GB)   .................................. 0128828.1

(51) Int. Cl.
*E21B 43/00*   (2006.01)

(52) U.S. Cl. ........................ 405/173; 405/170; 405/158; 405/184.4; 405/188; 166/343

(58) Field of Classification Search ............. 405/154.1, 405/158, 170–173, 184.4, 188, 189; 166/342–344, 166/347–349

See application file for complete search history.

(56) References Cited

U.S. PATENT DOCUMENTS

| 4,382,717 A | 5/1983 | Morrill |
| 4,436,449 A * | 3/1984 | Smoot et al. ............... 405/158 |
| 4,459,065 A * | 7/1984 | Morton ....................... 405/171 |
| 4,591,292 A | 5/1986 | Stevens et al. |
| 4,906,136 A * | 3/1990 | Norbom et al. ............. 405/169 |
| 5,593,249 A | 1/1997 | Cox et al. |
| 5,730,551 A * | 3/1998 | Skeels et al. ............... 166/347 |
| 6,022,421 A * | 2/2000 | Bath et al. ...................... 134/8 |
| 6,024,514 A * | 2/2000 | Ostergaard ................... 166/343 |
| 6,234,717 B1 * | 5/2001 | Corbetta ..................... 405/170 |
| 6,481,504 B1 * | 11/2002 | Gatherar ..................... 166/344 |
| 6,503,021 B1 * | 1/2003 | Corbetta ..................... 405/170 |

FOREIGN PATENT DOCUMENTS

| EP | 0 296 137 | 12/1988 |
| GB | 2 323 907 | 10/1998 |
| GB | 2 343 493 | 5/2000 |
| GB | 2 347 183 | 8/2000 |
| JP | 05065977 | * 3/1993 ................ 405/170 |

OTHER PUBLICATIONS

International Search Report dated Apr. 2003.

* cited by examiner

*Primary Examiner*—Frederick L. Lagman
(74) *Attorney, Agent, or Firm*—Ostrolenk, Faber, Gerb & Soffen, LLP

(57) ABSTRACT

An apparatus for substantially horizontal connection of a conduit to a subsea structure: A frame connectable to and supportable by the subsea structure, the frame has a docking device operable to allow a horizontal connection device, including one of a remotely operated vehicle and a toolskid, to dock with the frame such that the frame is capable of bearing at least part of an operational load associated with the horizontal connection of the conduit to the subsea structure.

16 Claims, 12 Drawing Sheets

APPARATUS AND METHOD FOR HORIZONTAL SUBSEA CONNECTION

CROSS-REFERENCE TO RELATED APPLICATIONS

This application is based on and claims priority to PCT Application PCT IB02/05742, filed Nov. 29, 2002, and to GB Application 0128828.1, filed Dec. 1, 2001, the entire disclosures of which are incorporated herein by reference.

This application is also related to U.S. patent application Ser. No. 10/497,066, filed Aug. 23, 2004, which in turn, is based on GB Application 0128828.1, filed Dec. 1, 2001, in the name of Calum MacKinnon, and commonly owned herewith, entitled SUBSEA CONNECTION APPARATUS, the entire disclosures of which arc also incorporated herein by reference.

BACKGROUND OF THE INVENTION

1. Technical Field of the Invention

The present invention is an apparatus and method for horizontal subsea connection of flexible or rigid flowlines and umbilicals or bundles (hereinafter referred to as conduits) to subsea structures.

2. Relevant Art

One of the most complex tasks required to be undertaken by means of diverless intervention is that of connecting conduits to subsea structures. Typically connection is achieved by fitting a termination head of a conduit to a connection hub of a subsea structure and then performing the connection with a subsea connection clamp.

Where the conduit is deployed to the seabed with an end termination head at some time prior to connection, the technique is called On-seabed connection. In such cases, the conduit is pulled to the subsea structure after deployment on the seabed and the termination head connected to the subsea structure at a later date. This type of connection is used predominantly in the North Sea or other offshore environments where the weather conditions are unpredictable. These types of connections are usually compact and, as the connections are horizontal, the size of the seabed structure is usually small.

Deployment of horizontal connections onto the seabed, rather than onto the structure, involves some risk associated with the type of seabed onto which the conduit is to be placed. Deployment on soft seabed will result in sinkage of the conduit termination head, an increase in pull-in loads and reduced visibility. The operation of pulling the termination across the seabed and into the connection position is typically performed by a mobile manipulating device in the form of a toolskid mounted onto an ROV. The ROV provides the electrical or hydraulic power, and buoyancy to allow it to support the toolskid and the termination head of the conduit. Thrusters are provided on the ROV to manoeuvre it and the toolskid around. In general the toolskid functions to pull the termination head of the conduit to the subsea structure and to connect the termination head to the subsea structure and is typically actuated by the ROV through a wetmate connection.

The toolskid is designed to accommodate high pull-in and alignment loads. Consequently toolskids are required to be large enough to cope with these mechanical loads as well as hydrostatic pressure.

On-seabed connection becomes very difficult in deep water. Whilst it is possible to use known, standard ROVs and toolskids up to a depth of 600 m, new designs of ROV and toolskid are required because the toolskids must be larger and more powerful, because the hydrostatic pressure increases with depth. Furthermore, as depth increases, transmission becomes slower and more difficult, and the consequent delay means that the ROV is more difficult to control and higher pull-in and alignment loads are experienced.

Conduits may be connected to subsea structures by docking an ROV and toolskid onto the conduit termination head then flying the termination head to the subsea structure along guide ropes, using a winch and the ROV thrusters. The ROV and toolskid then dock on the subsea structure and connect the conduit to the structure.

U.S. Pat. No. 5,593,249 describes an ROV having a skid frame mounted on it. The ROV is used to 'fly' the conduit from its position on the seabed to the subsea structure. The skid frame houses a pair of winches which are used as well as the ROV thrusters to position the open end of a flowline at a suitable position for connection to the subsea structure. In such applications, a large load is borne by the ROV. This makes the apparatus disclosed in U.S. Pat. No. 5,593,249 unsuitable for use in deep water, because of the large hydrostatic pressures and mechanical loads that would be borne by the ROV.

It is also known to use the ROV and the toolskid docked directly on the subsea structure to perform the pull-in operation, using pull-in ropes previously attached to the termination head by the conduit. But during the pull-in operation and the aligning operation, all the loads are borne directly by the toolskid and the ROV which have to be designed in order to resist to these loads.

Another known conduit connection system (U.S. Pat. No. 5,501,549) consists of a housing with a pivotable frame which is used to manipulate the end of the conduit between a slanting pulling position and a final horizontal connection point.

In yet another known conduit connection system, (GB2307288), an ROV is used in conjunction with a lift line that extends from the surface to support a skid and flowline. In this case, it is difficult to control the position of the skid and conduit from the surface. Any heave or pitch occurring at the surface will cause erratic movement of the flowline and may result in damage to the flowline and to the subsea structure.

SUMMARY OF THE INVENTION

It is an object of the present invention to obviate these problems and to allow horizontal connection of conduits to subsea structures in deep (>600 m) water.

In accordance with a first aspect of the present invention there is provided an apparatus for substantially horizontal connection of a conduit to a subsea structure, the apparatus comprising a frame being connectable to and supportable by the subsea structure, the frame having docking means to allow horizontal connection means including a remotely operated vehicle and/or a toolskid to dock with the frame such that the frame is capable of bearing at least part of an operational load associated with the horizontal connection of the conduit to the subsea structure.

Preferably, the frame comprises a working area in which the conduit is connected to the subsea structure located, in use, adjacent to a connection point of the subsea structure and a handling area adjacent to the working area which, in use provides access to the subsea structure.

Preferably, the frame is provided with a latch, the latch being connectable to the conduit to allow the conduit to be supported by the frame in a position adjacent to the frame.

Preferably, the frame further comprises docking means connectable to the subsea structure.

Preferably, the docking means comprises a sleeve adapted to co-operate with a guide pin located on the sub-sea structure.

Optionally, the frame is permanently attached to the subsea structure.

Preferably, the toolskid comprises a pull-in module and/or a stroke-in module.

In accordance with a second aspect of the present invention there is provided a method of connecting a conduit arranged substantially horizontally and located on or near the seabed to a subsea structure, the method comprising the steps of pulling the conduit towards the subsea structure, aligning the conduit with a conduit connection point located on the subsea structure and connecting the conduit to the conduit connection point, wherein a frame capable of bearing at least some of the mechanical load associated with the steps required to perform the connection of the conduit to the subsea structure is connected to and supported by the subsea structure before pulling the conduit.

Preferably, the step of pulling the conduit towards the subsea structure is performed by a pull-in module, removeably attached to the frame.

Preferably, the conduit is capable of being suspended from the frame for a predetermined period of time before connection to the subsea structure.

Preferably, the step of aligning the conduit with a conduit connection point is performed by the pull-in module.

Optionally, the step of aligning the conduit with a conduit connection point is performed by a stroke-in module.

BRIEF DESCRIPTION OF THE DRAWING(S)

Embodiments of the present invention will now be described by way of example, only with reference to the accompanying drawings of which:

FIGS. 1a and 1b are perspective views of a docking frame in accordance with the present invention, FIG. 1c is a side view of the docking frame of FIGS. 1a and 1b and FIG. 1d is a plan view of the docking frame of FIGS. 1a and 1b;

Figure 5A:
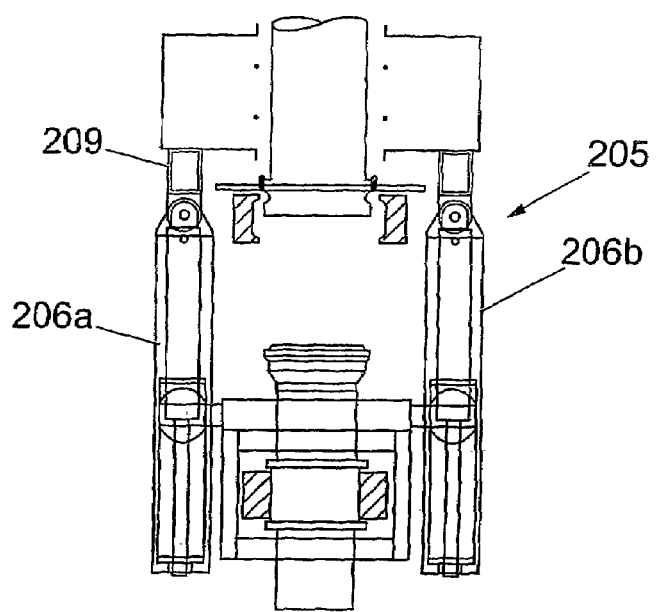
Figure 5B:
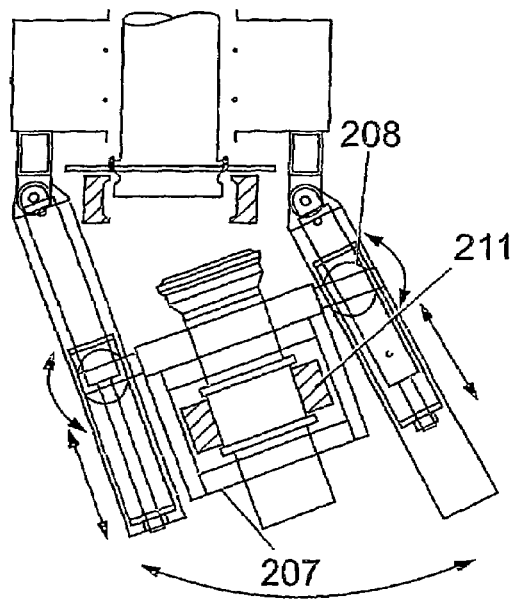
Figure 5C:
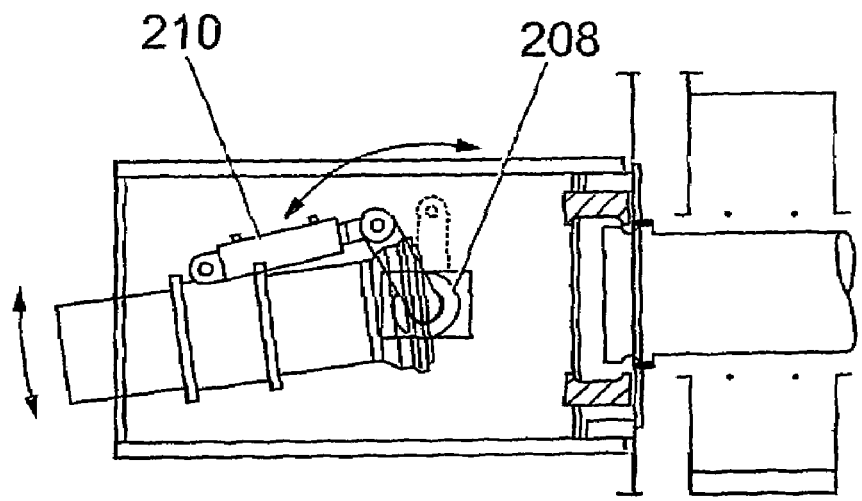
Figure 5D:
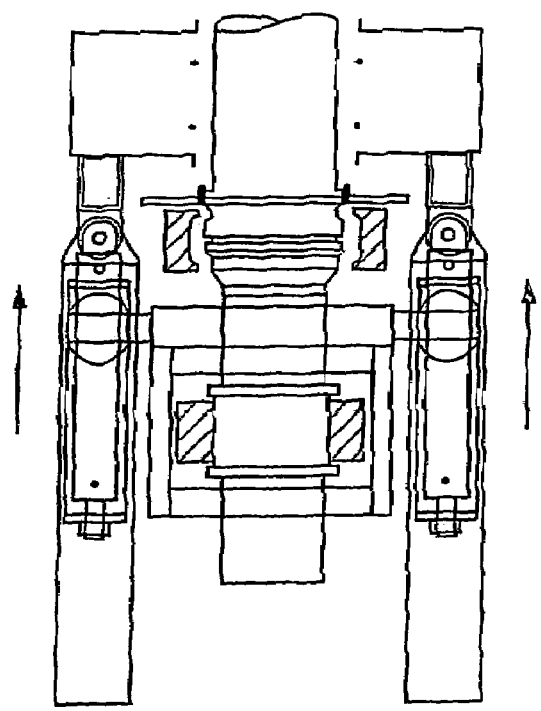

FIGS. 5a to 5d illustrate another embodiment of the docking frame according to the invention. FIGS. 5a and 5b are plan views of the frame and the termination end of the conduit during alignment operations. FIG. 5c is a side view of an alignment operation. FIG. 5d is a plan view after the stroke-in of the conduit, i.e. after the conduit has been moved into its final position, ready for clamping to the subsea structure.

DETAILED DESCRIPTION OF PREFERRED EMBODIMENTS OF THE INVENTION

The apparatus and method of the present invention are designed to provide a way of performing substantially horizontal on-seabed connection of a conduit such as a rigid or flexible pipeline, an umbilical, a bundle of lines or any other subsea conduit. In order to do so, a frame has been designed for connection to the subsea structure, such that the frame is capable of bearing some or all of the loads associated with horizontal on-seabed connection that were previously borne mostly by the ROV and toolskid. In particular, the frame of the present invention is capable of bearing at least 75% of these loads.

FIGS. 1a to 1d show a docking frame 5 in accordance with the present invention attached to a subsea structure 1.

In this example, the frame 5 is attached to a subsea porch structure having two inboard hubs 2 (see FIG. 1c) to which-pipelines can be attached.

Figure 1A:
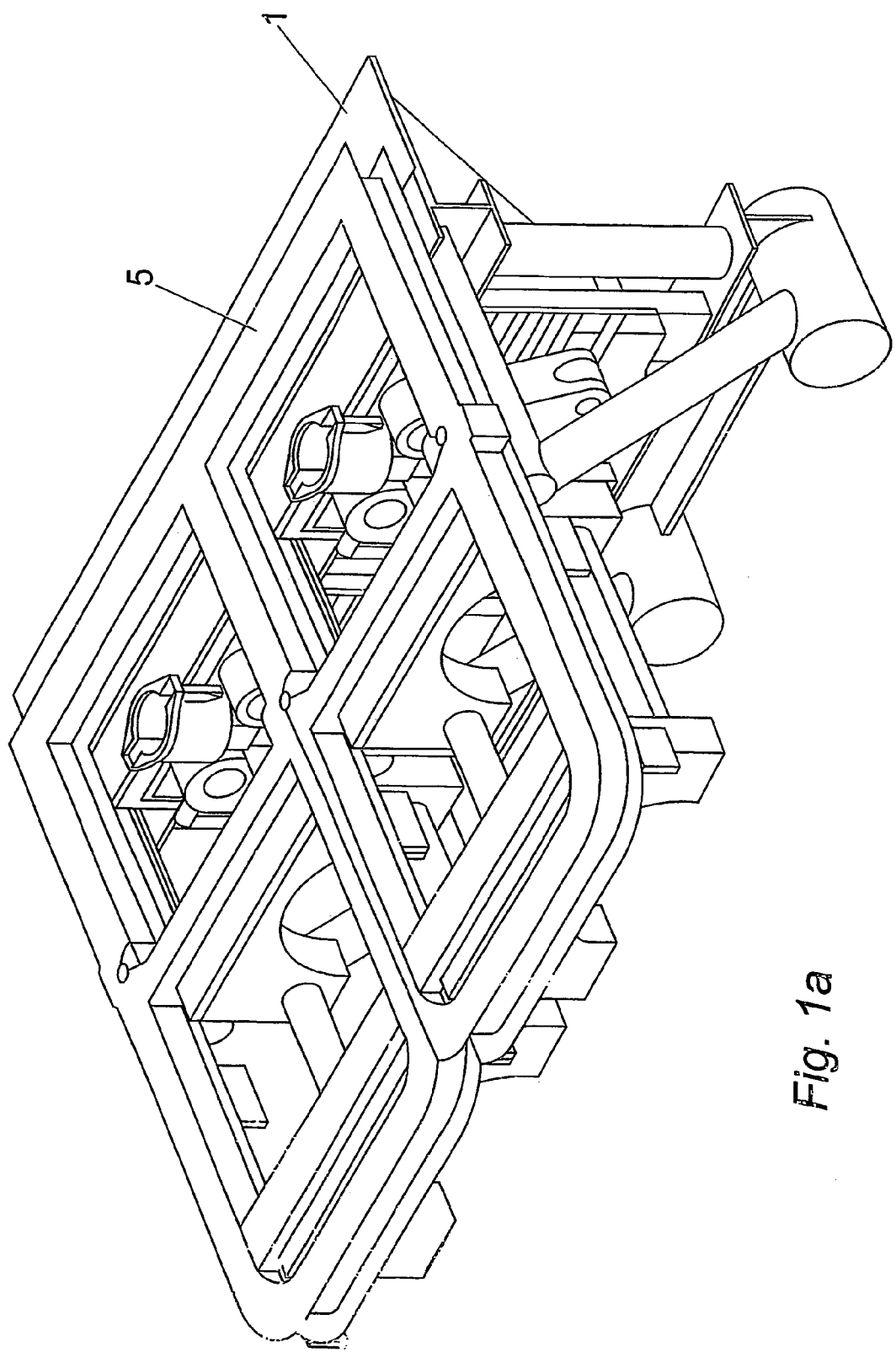

FIG. 1a is a perspective view with the docking frame 5 shown in dark shading and the subsea structure 1 shown in light shading. Details of the docking frame 5 will be described with reference to FIGS. 1b, 1c and 1d.

Figure 1B:
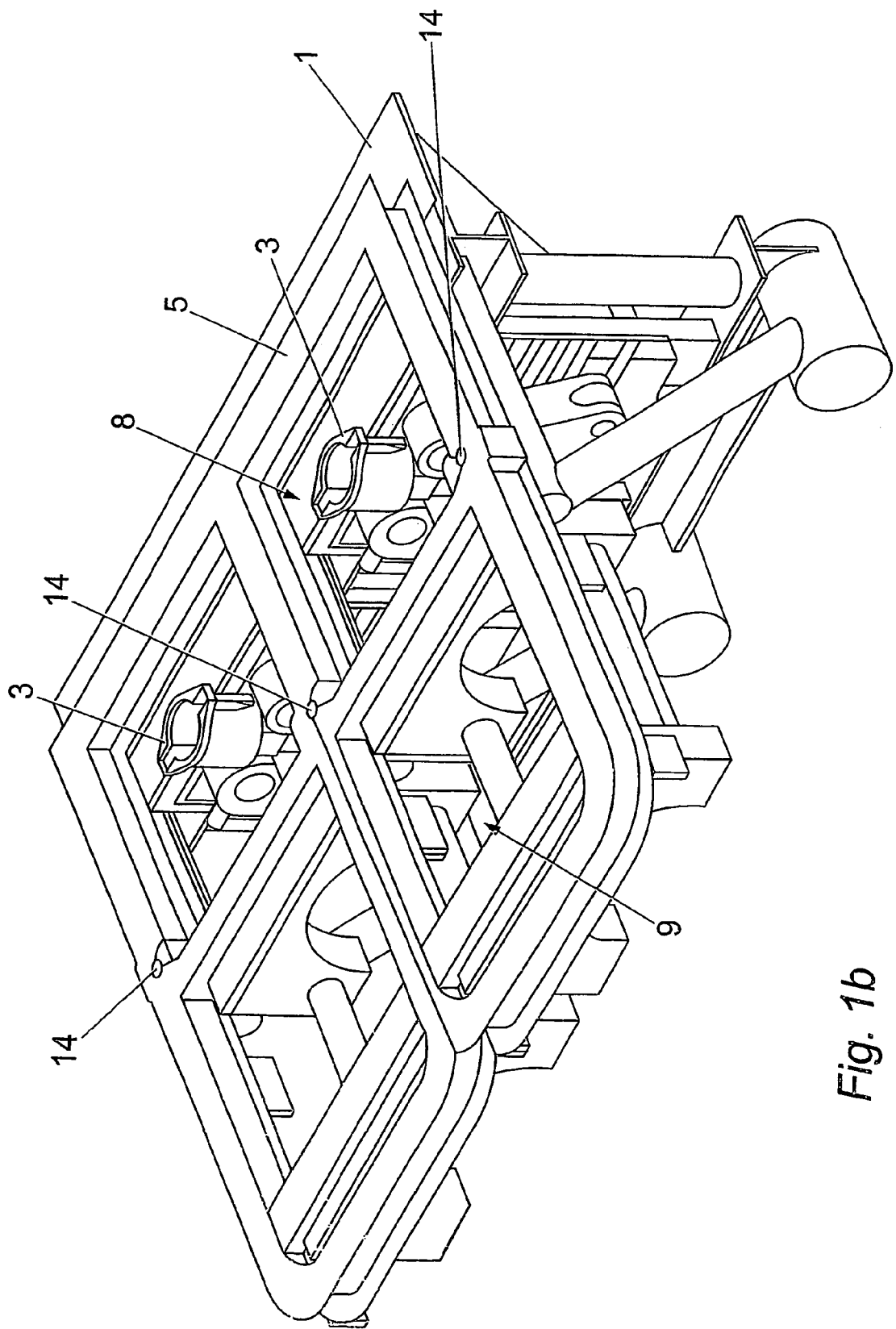
Figure 1C:
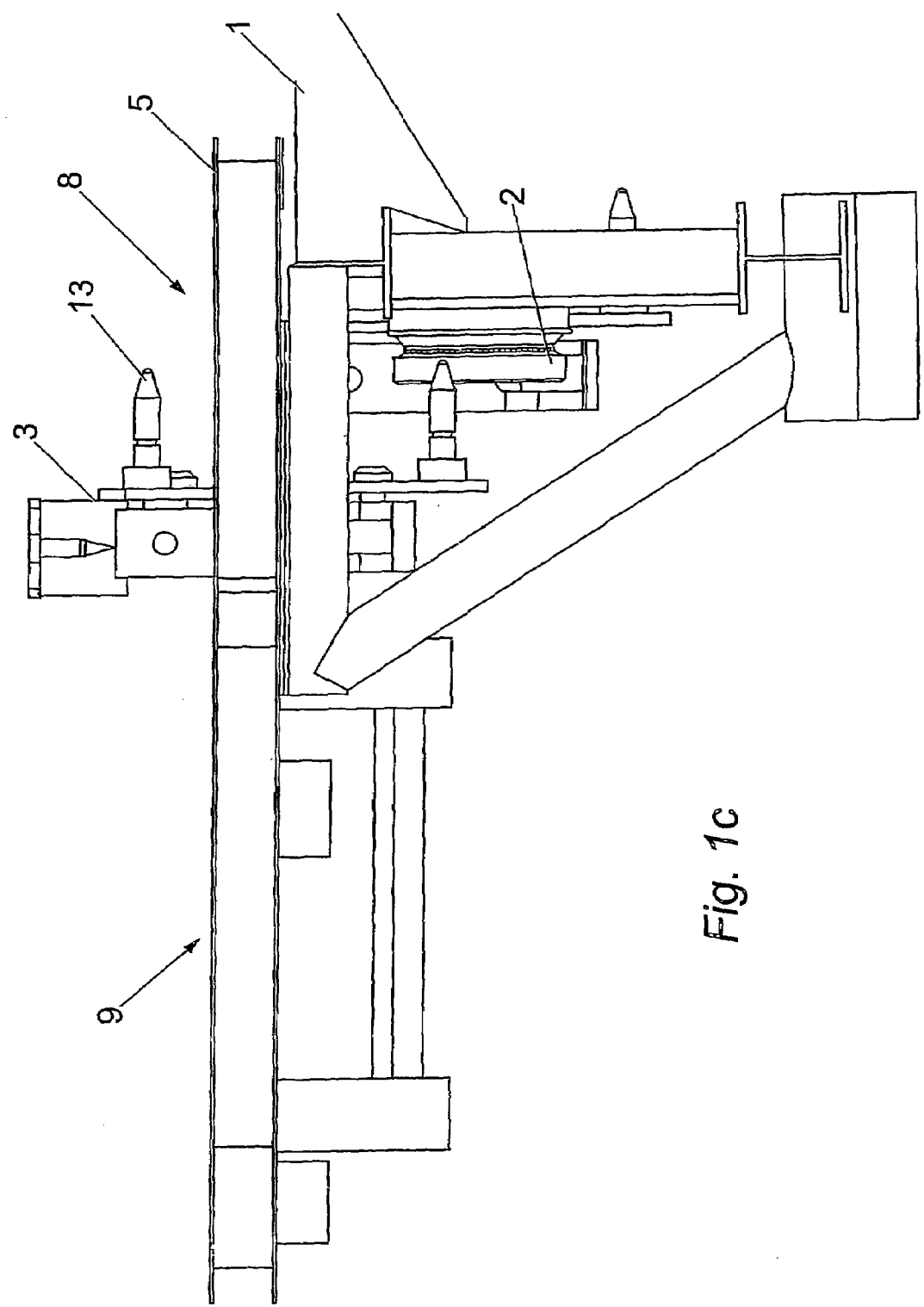
Figure 1D:
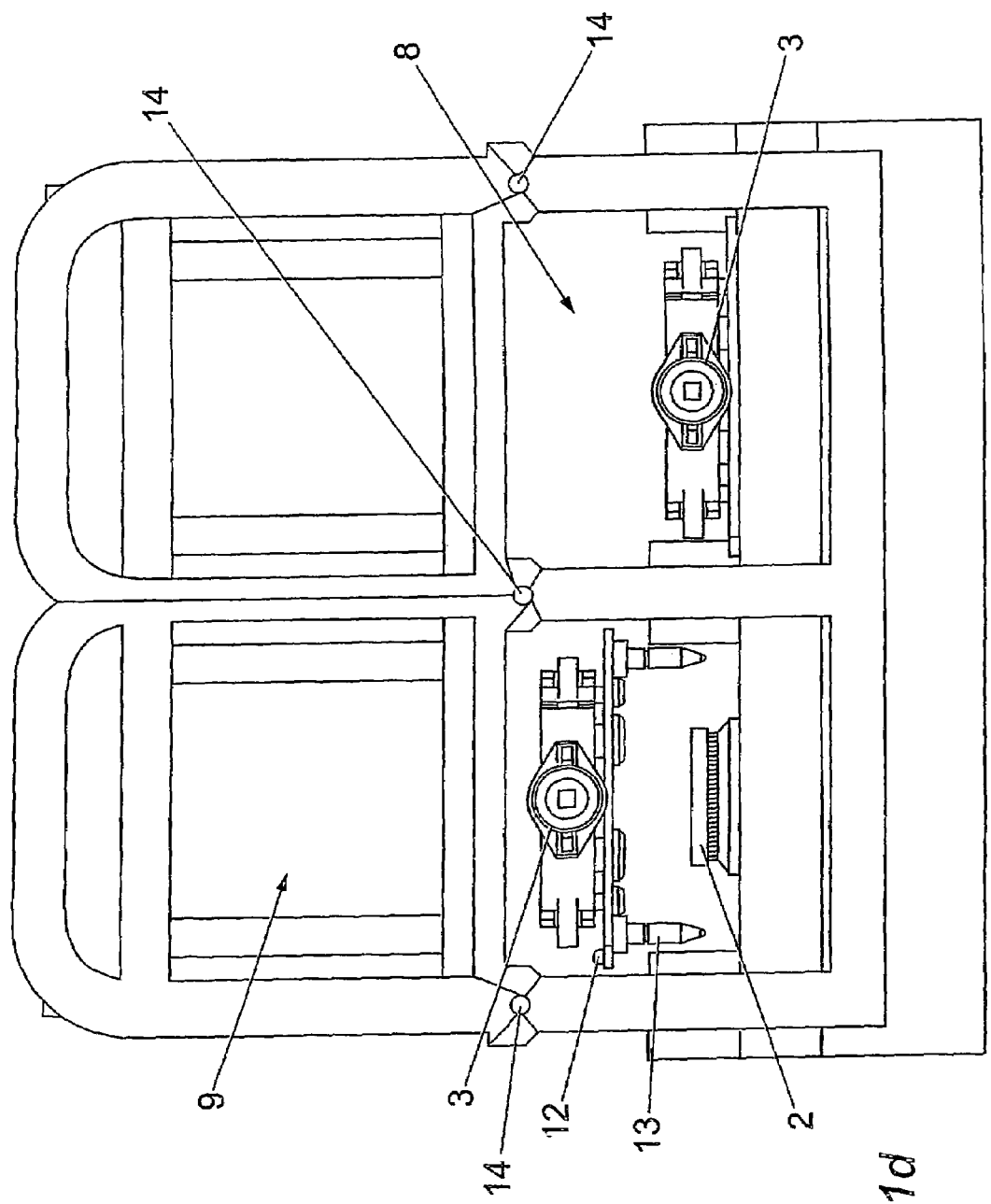

FIG. 1b shows the docking frame 5 having a work area 8 which is, in this example, used to facilitate clamp operations such as seal replacement, seal area inspection and cleaning, clamp opening and closing, external seal testing and clamp removal and replacement. Handling area 9 is used to provide access to the area on the subsea porch 1 where the termination head of the pipe will be handled.

Typically, a pull-in-Module (PIM) (see FIGS. 2a to 2e) contained on a toolskid is used to pull the termination head from the seabed to the structure. The PIM is provided with at least one winch 21 for pulling the termination head from the seabed to the seabed structure using a rope 22 previously connected to the termination head. Once this pulling is done, the termination head is then guided and aligned to it's working position illustrated in FIG. 2f. This alignment can be performed using guiding end aligning means situated on the frame 5 and actuated by the PIM 20. These means may use a handling frame movable along part of the docking frame 5 and a hang off latch 26 and a rear cylinder 25 for joining the termination head to the handling, frame with a first vertical orientation (see FIG. 2c).

In an alternative embodiment, the horizontal and vertical orientation of the termination head is adjustable using only the PIM, which can rotate the termination head and move it axially into its working position. When the termination head has been pulled to the frame, it can be handled either by a specific arrangement on the frame or by the PIM of the toolskid to perform the alignment of the conduit to it's working position. This can be done because most of the mechanical load and hydrostatic load is borne by the frame. A stroke-in-module (SIM) is then used to provide an axial stroke of the termination head to a connection clamp and is used to connect the termination head and the connection hub.

FIGS. 5a to 5d show in detail the guiding and aligning means and the handling means of one embodiment of a docking frame according to the present invention. The frame 205 comprises two pivotable outer slide boxes (206a and 206b) for accommodating angular displacement and a front section 209. The slide boxes are pivotable on front section 209. The ROV will dock on front section 209. Cylinders are provided which will control the stroke-in distance, the lateral linear displacement and the angular displacement of the outer slide boxes and ensure the alignment of the conduit in the horizontal plane and a favourable position of the handling frame as illustrated in FIGS. 5a and 5b. The outer slide boxes support a conduit handling swivelling frame 207 which handles the termination end of the conduit using a clamp 211. A swivel connection 208 with control cylinders 210 allows a pivotable movement between the handling frame and each outer slide box and ensures the alignment in the vertical plane as illustrated in FIG. 5c.

Referring to the drawings, interfaces 14 (see FIG. 1b) are incorporated in the frame 5 to enable docking and operation of an ROV and toolskids. The interfaces 14 of the frame will co-operate with docking pins (not shown) of the toolskid. The PIM 20 (FIG. 2a) of the toolskid can be designed with a winch 21 situated at the bottom of the toolskid frame directly on the docking pins. Therefore, the load from the winch 21 would be transferred through interfaces to the frame and the load path through the toolskid frame structure would be minimal. The frame will then accommodate all the bending moment caused by the winch 21 pull-in. In a preferred embodiment, the winch is pulling the rope 22 directly without any other diverting means situated in the toolskid.

Figure 3:
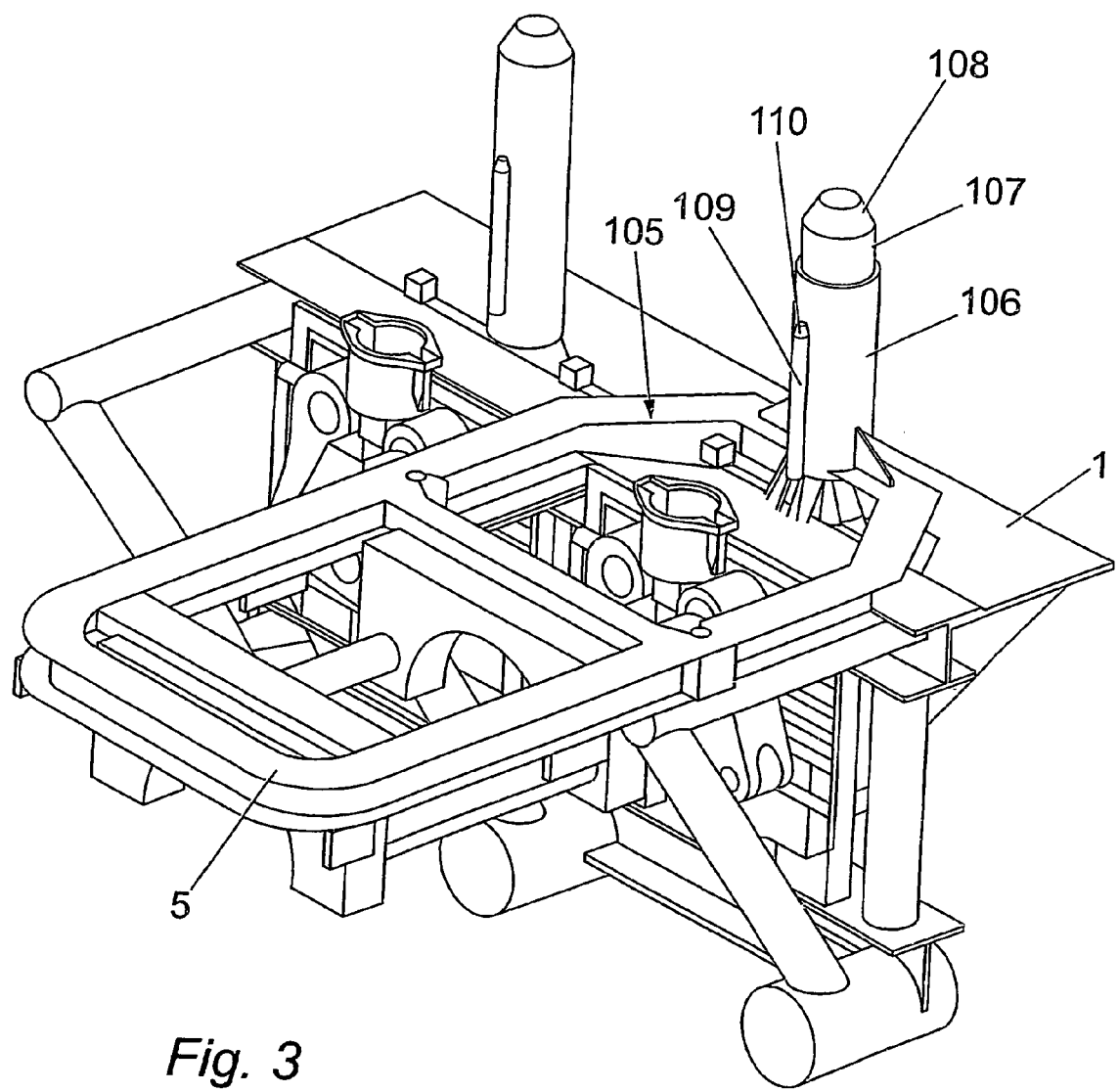
FIG. 3 is a perspective view of a single frame in accordance with the invention.

The docking frame 5 can be installed permanently on the subsea structure. But preferentially, the docking frame is a separately deployed unit. It can be removably connected to the subsea structure for that, FIG. 3 shows an alternative embodiment of the frame 105 in which a single docking frame 5 is removably connected to the subsea structure 1. In this example, the frame contains a docking sleeve or funnel 106 which is connectable to a guide pin 107 located upon the subsea structure. The guide pin 107 has a frusto-conical end 108 which makes it easier for the docking sleeve to connect with the guide pin.

The guide pin 107 is also provided with pins 109 which co-operate with slots in the side of the docking sleeve 106 to ensure the correct orientation of the frame 105 with respect to the subsea structure. The docking frame 105 may be deployed from the surface on a centralised guide wire extending through the sleeve 106 for engagement with the guide pin 107 or it can be deployed on the seabed and installed later using an ROV.

FIG. 1b shows the frame 5 located on a subsea structure above two connection points which are located below the central actuation means 12 (see FIG. 1d) of the connection clamp 3.

Each connection point is provided with a clamp 3 that contains a central actuation mechanism 12 and a horizontal leadscrew which allows for a very narrow clamp width of the subsea connection clamp 3. This feature further minimises the distance between pipe centres once connected to the subsea structure.

In addition, the clamp 3 may be replaced in-situ by unlocking docking pins 13 (FIG. 1c), axially retracting the clamp until it clears the inboard hub 2 and then vertically moving the clamp through working area 8.

The method used to connect an on-seabed conduit will now be described with reference to FIGS. 2a–2h. The method and apparatus of the present invention utilise known ROV and toolskid designs. The first main toolskid component is the pull-in module (PIM) 20 which acts to pull the termination head from the seabed to a hang-off position on the docking frame. The PIM 20 may also house the handling mechanisms for aligning and orientating the termination into the working position. The second main toolskid component is the stroke-in module (SIM) 19 (see FIGS. 2g and 2h) which houses tooling to enable hub preparation operations and clamp closing operations. The SIM is also used for final stroking and alignment of the termination head.

The procedure for manoeuvring the termination head to the seabed structure is explained with reference to FIGS. 2a to 2h.

Figure 2A:
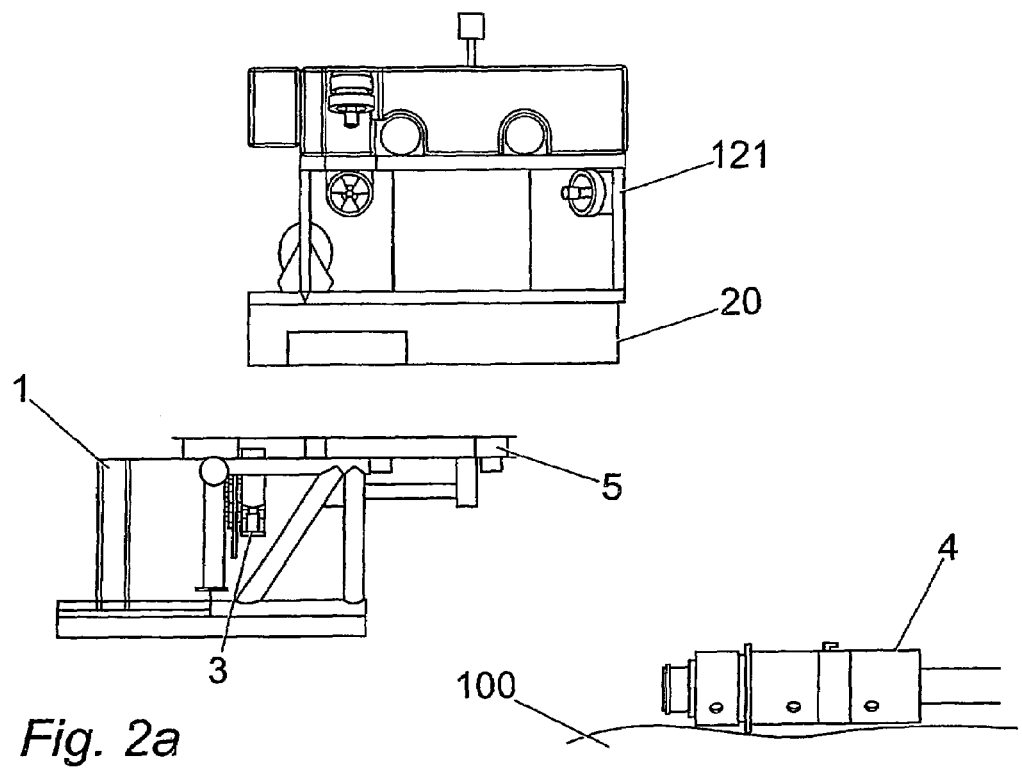
FIGS. 2a to 2h show the use of the docking frame to install a seabed deployed horizontal connection in accordance with the method of the present invention.

FIG. 2a shows a termination head 4 of a conduit, in this case a flowline, deployed onto the seabed 100. Also shown is the docking frame 5 which is mounted onto the subsea porch structure 1. The docking frame 5 may be permanently mounted to the porch structure 1 or it could be retrievably mounted thereon. The ROV 121 is shown with a toolskid containing a PIM 20.

Figure 2B:
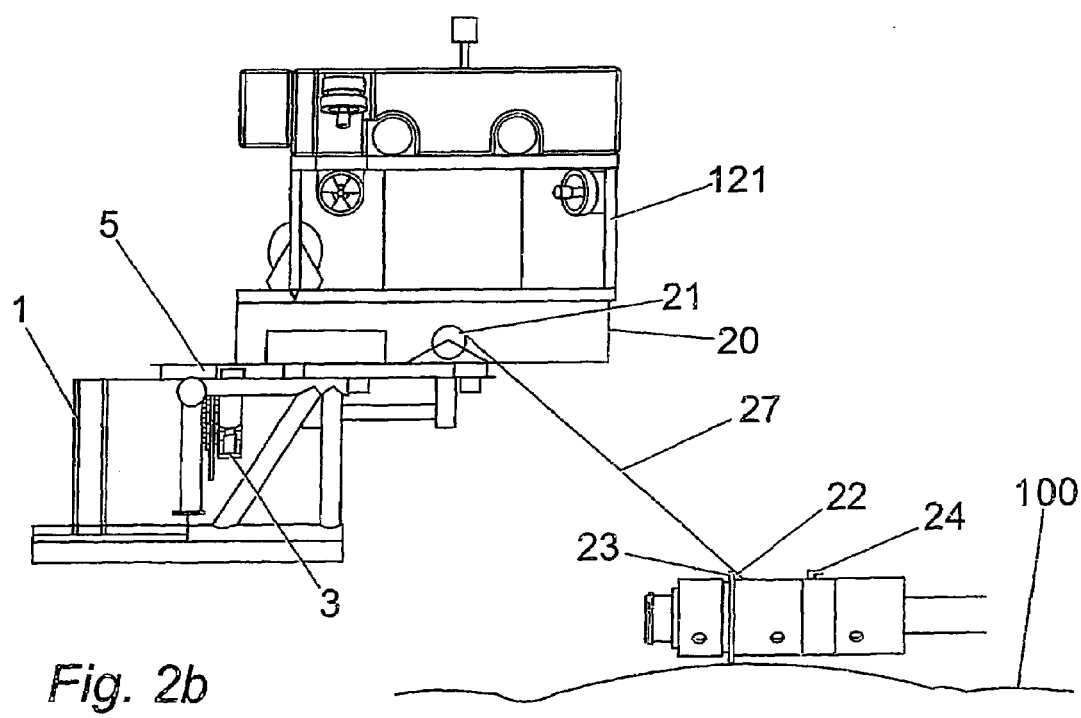

In FIG. 2b, the ROV 121 with PIM 20 has been landed on the docking frame 5 and engaged on the interfaces 14. Previously a pull-in rope 27 on Winch 21 has been deployed by the ROV 121, and the rope anchor 22 is attached to termination head latch point 23. It will be appreciated that more than one pull-in rope may be used.

Figure 2C:
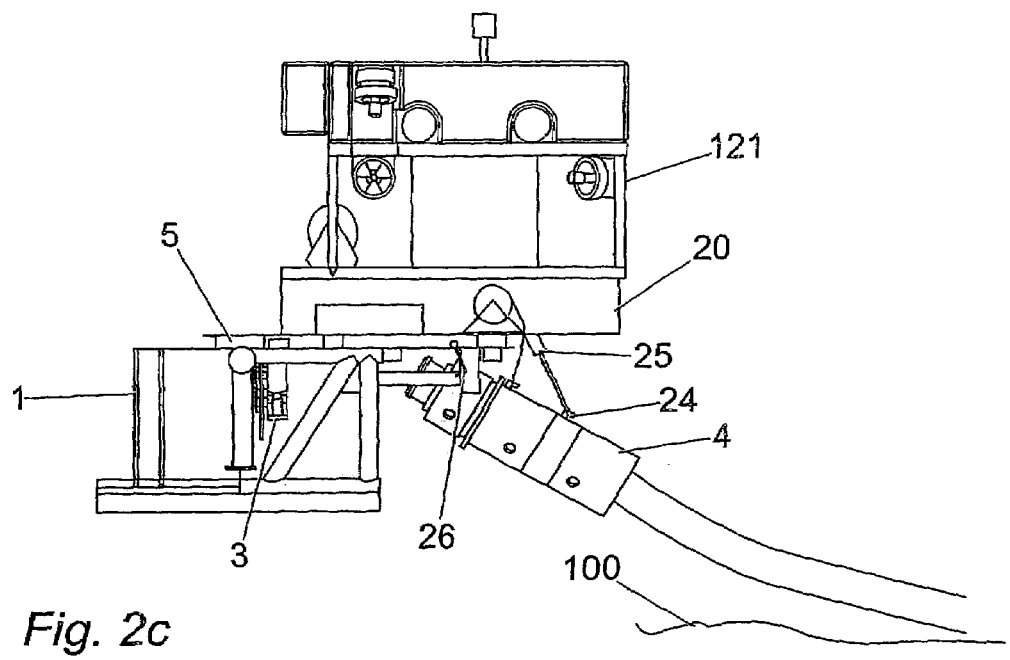

In FIG. 2c, winch 21 then pulls the termination head 4 across the seabed and up to the docking frame 5. Once the termination head 4 is in close proximity to the underside of the docking frame 5, hang-off latch 26 is engaged. This hang-off latch 26 may be provided on an handling frame of the docking frame 5. Thereafter, the termination head 4 is attached to the docking frame 5. This completes the pull-in of the termination head 4 from the seabed to the docking frame 5.

The next stage is to align the termination head 4 and to move it into the working position. It can be performed either directly by the PIM 20 or by guiding and aligning means provided on the frame 5 and actuated by the PIM 20.

FIG. 2c, shows the PIM docked on to the docking frame. The rear cylinder 25 is deployed to be attached onto reaction ring 24. The rear cylinder 25 is then energised to lift the rear of the termination head 4 to be in position at the correct height and in primary axial alignment with the connection point of the subsea porch structure 1.

It is preferred that this alignment is done horizontally, although it can be done at an angle to the horizontal depending upon the configuration of the subsea connection point.

Figure 2D:
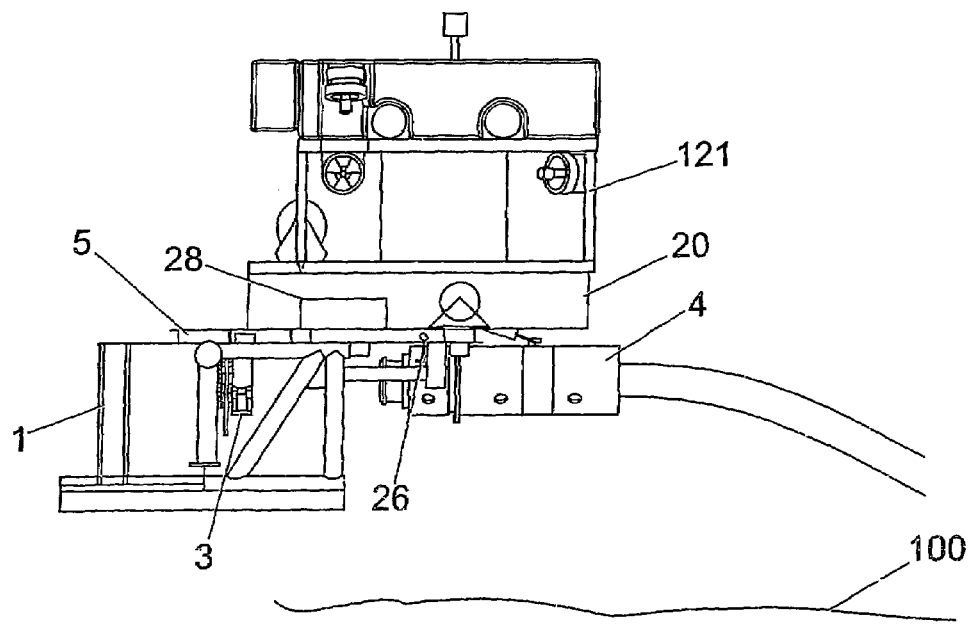

FIG. 2d shows the termination head 4 being actuated forward into the working position by a handling unit 28 mounted within the PIM toolskid 20. The handling unit 28 actuates a handling frame 10 and the hang-off latch 26. In this example, the handling frame consists of a trolley that is moveable along the docking frame towards and away from the subsea structure.

Alternatively, the PIM 20 can provide the functionality of the handling unit 28 and handling frame. With the termination head 4 held on the handling frame and the hang-off latch 26, the rear cylinder can be released. The handling frame and it's aligning means can then act to provide secondary alignment of the termination head 4 with respect to the connection clamp 3 and also to orientate the termination head 4 if required.

Figure 2E:
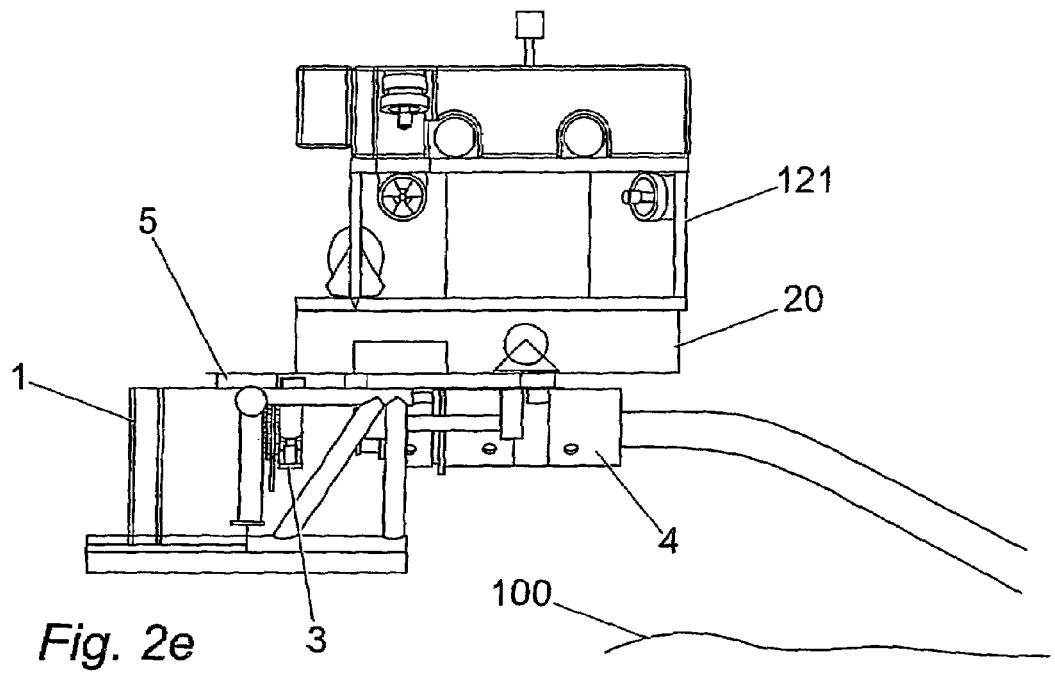
Figure 2F:
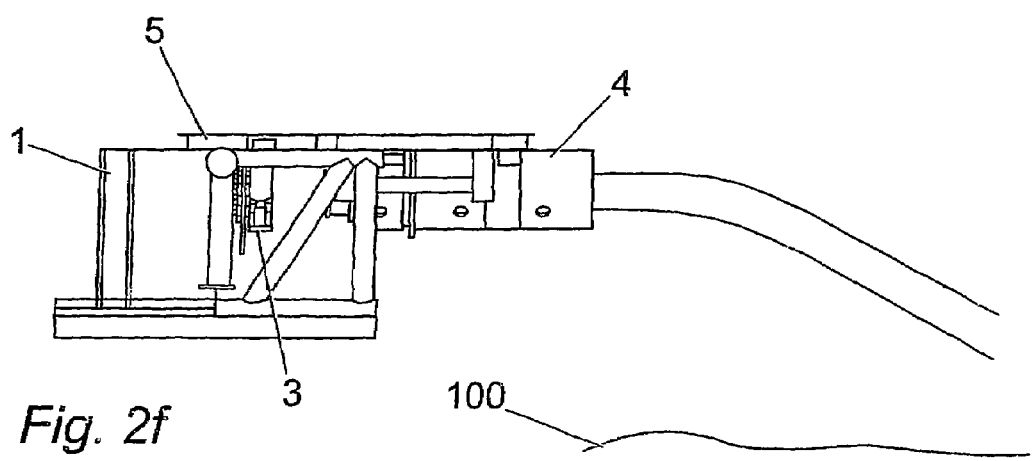
Figure 2G:
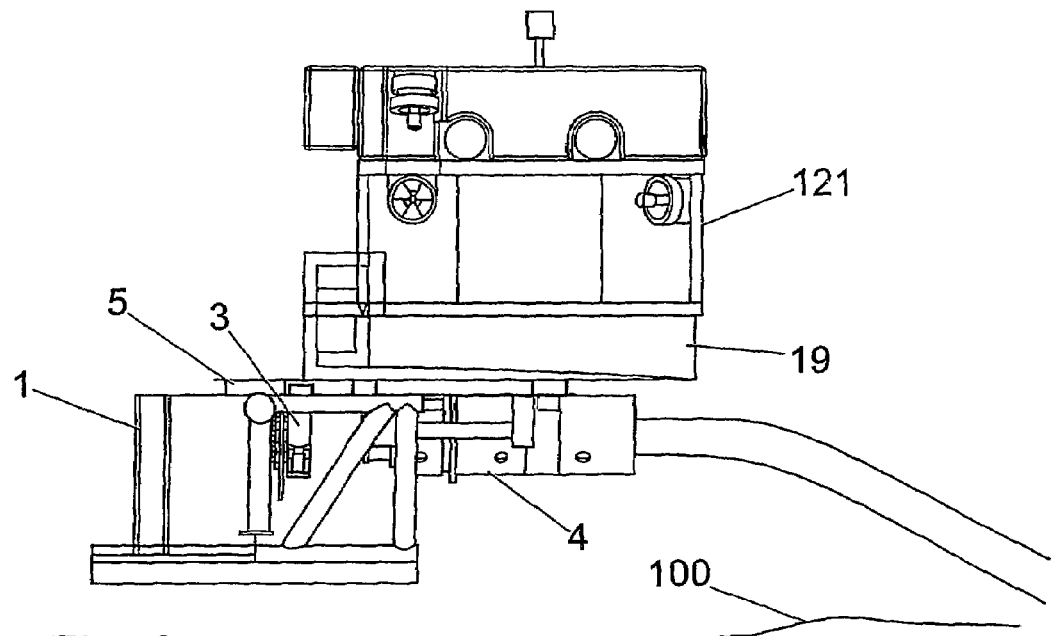
Figure 2H:
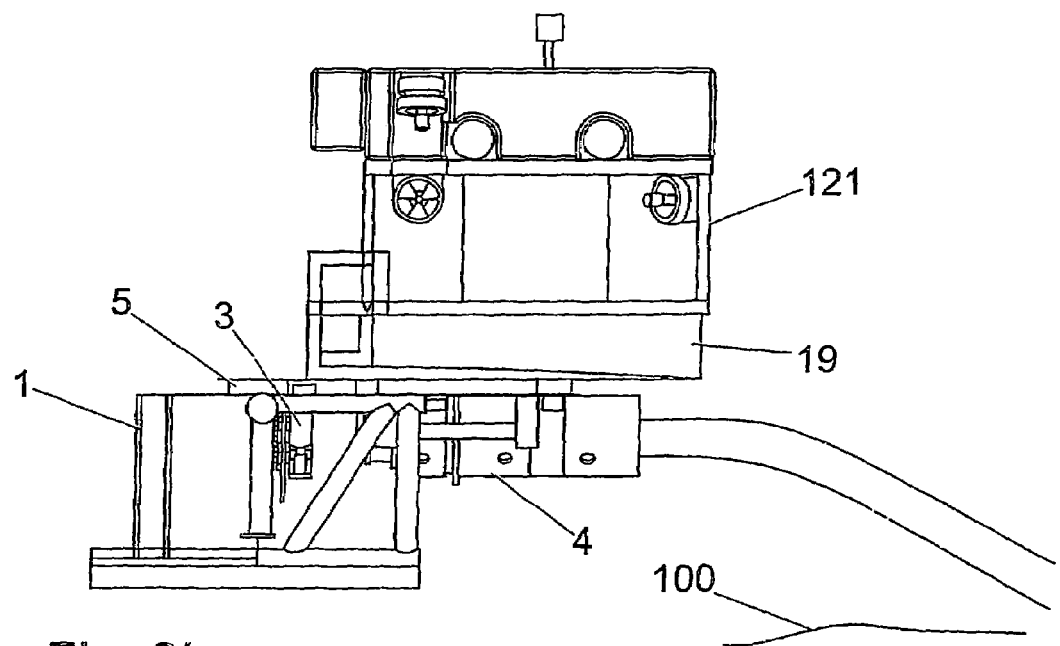

FIG. 2e shows the termination head being structurally clamped to the docking frame by the handling frame after the correct working position and orientation have been achieved. In this position the termination head 4 is axially aligned with the connection clamp 3 and separated by a distance of about 600 mm. The PIM toolskid 20 may then be undocked. FIG. 2f shows the docking frames without the ROV and PIM toolskid 20.

The ROV fitted with SIM Toolskid 19 is then docked onto the interfaces 14 on top of the docking frame 5, The SIM 19 is used to perform the following tasks:
Pressure Cap Removal;
Debris Cap Removal;
Seal removal/replacement; and
Seal Area Inspection and Cleaning.

Once the hubs have been prepared, the SIM 19 is used to stroke the termination head axially 600 mm to mate with the inboard hub flange 2. The clamp 3 is then closed using the actuation mechanism 12. An external seal test may be made to prove the connection integrity. This process could be reversed for seal replacement operations in the event of a leaking connection.

It is envisaged that the configuration of the toolskid will be dependant on the technical specification required for a given application. The distribution of tasks performed by each unit may also change. The PIM, for example, may be used only to pull the termination into the working position. The SIM would therefore have to perform all the subsequent tasks. The toolskid may contain both PIM and SIM modules that pull-in and stroke-in operations can be carried out when the ROV and toolskid are docked on the frame. For example, the termination head will be pulled in to its working position and thereafter, the final stroke-in operation will be performed.

Alternatively, the pull-in and stroke-in operations can be performed by PIM and SIM components mounted in separate toolskids. This allows the stroke-in of a first connection to be performed simultaneously with the pull-in of a second connection performed using a second ROV.

The configuration of the tooling modules may also change. The toolskid could be deployed from the surface while attached to the ROV. Alternatively, the toolskid could be deployed to the seabed in a basket, the ROV would then mate to the toolskid subsea.

The docking frame 5 can be deployed separately from the subsea structure and then connected to the subsea structure. This is particularly appropriate where there are size or weight limitations that preclude deployment of the frame and subsea structure together. Or the docking frame could be deployed using an ROV to push the frame into the correct position for docking.

Alternatively, the docking frame could be installed by deploying the docking frame to the seabed in a basket from where it can be picked up by an ROV and installed on a seabed structure. In this case additional ROV Buoyancy may be required to enable the ROV to lift the frame or on the frame itself. In addition, smaller guide pins may be used where the frame is installed by ROV.

Another option would be for the toolskid to be provided with control and propulsion systems to enable it to operate as an ROV. This would provide benefits in terms of size and weight of the units and result in more efficient and speedy subsea operations.

Advantageously, by transferring most of the operational loads from the ROV and the toolskid to the frame, it is possible to use standard ROVs and toolskids for deepwater conduit connection and it is possible to reduce the size of ROV and toolskid used for deep water applications.

Figure 4:
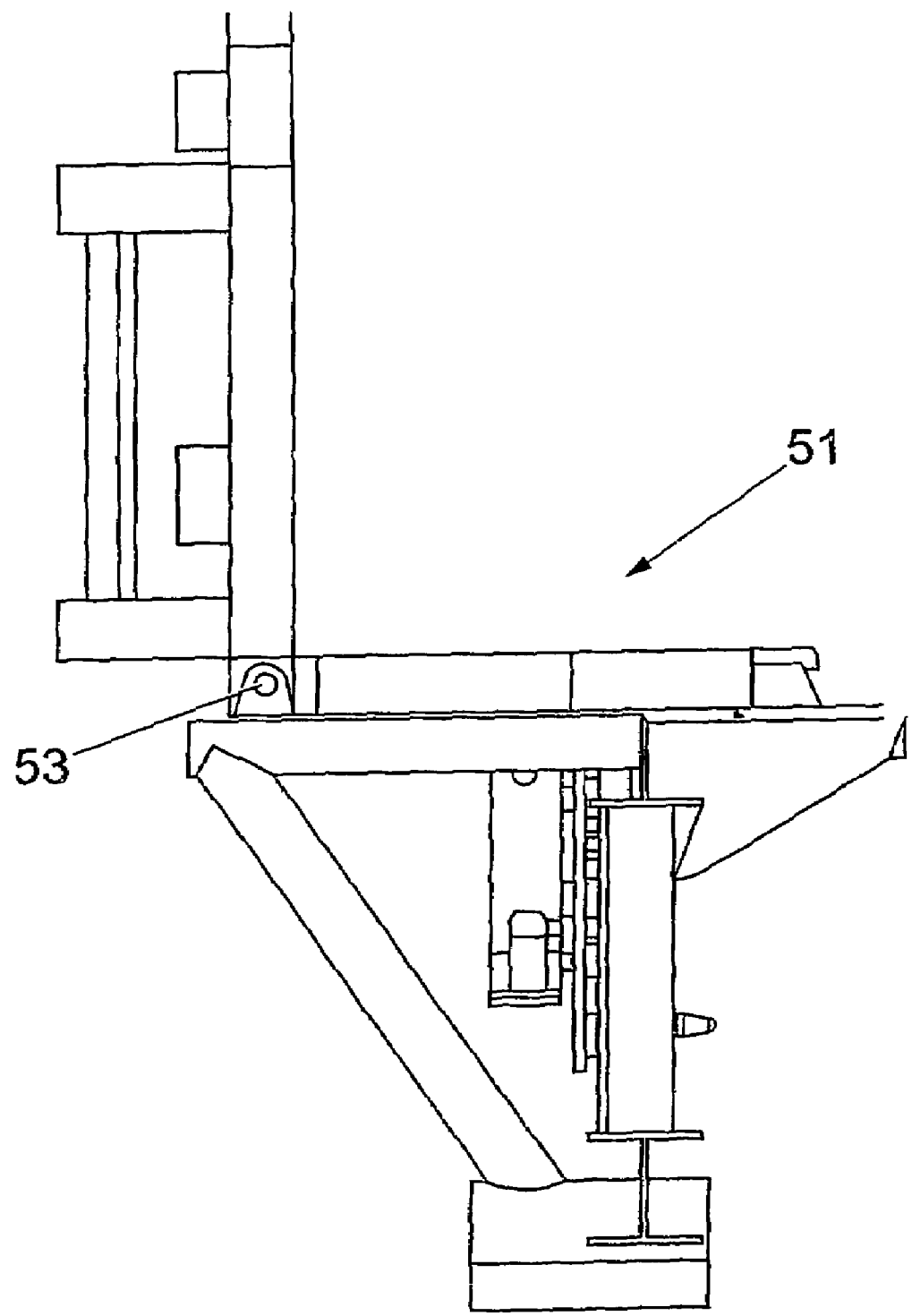
FIG. 4 is a side view of an articulated frame in accordance with the present invention.

FIG. 4 shows an articulated docking frame 51 having a joint 53 that allows the end of the frame to be articulated. This arrangement allows the docking frame 51 to be deployed through a moon pool or similar structure where the fully extended docking frame 51 is longer than the moon pool. Articulation allows the docking frame to be extended once it has cleared the area of the moon pool, usually on the sea bed.

Improvements and modifications may be incorporated herein without deviating from the scope of the invention.

The invention claimed is:

1. An apparatus for substantially horizontal connection of a conduit to a subsea structure, the apparatus comprising:
    a mobile manipulating apparatus comprising at least one of a remotely operated vehicle and a toolskid; and
    a separate frame constructed and configured to be connected to and supported by the subsea structure, wherein:
    the frame includes a docking apparatus operable to couple the mobile manipulating apparatus to the subsea structure when the frame and the subsea structure are connected together;
    the frame is constructed and configured to bear at least part of an operational load associated with the horizontal connection of the conduit to the subsea structure;
    the mobile manipulating apparatus includes a pull-in module having a winch adapted to engage the conduit, operable when the mobile manipulating apparatus is coupled to the frame, to deliver the conduit to the vicinity of the subsea structure;
    the frame includes a guiding and aligning mechanism operative to align and move the conduct from a point of delivery by the pull-in module to a working position; and
    the guiding and aligning mechanism includes: two slide boxes, each pivotally mounted on a front section of the frame; an actuator operable to selectively extend and retract each slide box; and,
    a conduit clamp supported at the outer ends of the slide boxes whereby the conduit can be aligned in a horizontal plane.

2. The apparatus as claimed in claim 1 wherein at least 75% of the operational load is borne by the frame.

3. The apparatus as claimed in claim 1 wherein the docking apparatus includes interfaces constructed and configured to receive docking pins for connecting the mobile manipulating device to the frame.

4. The apparatus as claimed in claim 3 wherein the winch is situated adjacent to the docking pins when the mobile manipulating device is connected to the frame.

5. The apparatus as claimed in claim 3 wherein the winch is situated adjacent to the docking apparatus when the mobile manipulating device is connected to the frame.

6. The apparatus as claimed in claim 1 wherein the frame comprises a working area located adjacent to a connection point of the subsea structure where, in use, the conduit is connected to the subsea structure, and a handling area adjacent to the working area which, in use, provides access to the subsea structure.

7. The apparatus as claimed in claim 1 further comprising a second docking apparatus constructed and configured to connect the frame to the subsea structure.

8. The apparatus as claimed in claim 7 wherein the second docking apparatus comprises a guide pin located on the subsea structure and a sleeve adapted to cooperate with the guide pin.

9. The apparatus as claimed in claim 1 wherein the frame is permanently attached to the subsea structure.

10. The apparatus as claimed in claim 1 further including:
    swivel connections between a first end of each slide box and the frame, with the swivel connections being oriented for pivoting movement of the slide boxes in respective vertical planes; and
    respective actuator mechanisms coupled to each slide box, the actuator mechanisms being operative to selectively pivot each slide box around its respective pivot connection.

11. The apparatus as claimed in claim 10 wherein the actuator mechanisms are each comprised of control cylinders coupled to their respective slide boxes.

12. A method of moving a conduit arranged substantially horizontally and located on or near the seabed, to a subsea structure, the method comprising:
    connecting a mobile manipulating device to the conduit;

docking the mobile manipulating device to a frame attached to the subsea structure; then pulling the conduit to the subsea structure using the mobile manipulating device with the frame bearing at least some of the mechanical load associated with the pulling operation; and connecting the conduit to the subsea structure using a guiding and aligning mechanism mounted on the frame which includes two slide boxes, each pivotally mounted on a front section of the frame, and a conduit clamp supported at the outer ends of the slide boxes, the connection being preformed by selectively extending and retracting each slide box to align the conduit in a horizontal plane.

13. The method as claimed in claim 12 wherein the step of pulling the conduit to the subsea structure further comprises aligning the conduit with a conduit connection point located on the subsea structure, and guiding the conduit to a working position.

14. The method as claimed in claim 13 further comprising moving the conduit from the working position and connecting the conduit to a conduit connection point located on the subsea structure.

15. The method as claimed in claim 12 further comprising suspending the conduit from the frame for a predetermined period of time before connecting the conduit to the subsea structure.

16. The method as claimed in claim 12 further including aligning the conduit in a vertical plane by selectively swiveling the slide boxes around respective horizontal axes.

* * * * *